July 16, 1963    J. J. LOVINGHAM    3,097,482
ROTARY INJECTOR FOR ROCKET POWERPLANT
Filed Dec. 22, 1960    2 Sheets-Sheet 1

INVENTOR.
JOSEPH J. LOVINGHAM
BY
AGENT

July 16, 1963  J. J. LOVINGHAM  3,097,482
ROTARY INJECTOR FOR ROCKET POWERPLANT
Filed Dec. 22, 1960  2 Sheets-Sheet 2

INVENTOR.
JOSEPH J. LOVINGHAM
BY
*William R. Wright*
AGENT

United States Patent Office 3,097,482
Patented July 16, 1963

3,097,482
ROTARY INJECTOR FOR ROCKET POWERPLANT
Joseph J. Lovingham, Madison, N.J., assignor to Thiokol Chemical Corporation, Bristol, Pa., a corporation of Delaware
Filed Dec. 22, 1960, Ser. No. 77,760
11 Claims. (Cl. 60—35.6)

This invention relates generally to rocket powerplants and more particularly to a rotatable shear slide injector for the combustion chamber thereof.

The use of cylindrical, shear slide injectors of the axially moving type is known in current packaged liquid powerplants as are also certain inherent design penalties and restrictions arising from such use.

One of the inherent problems associated with a slide is the occupying by the slide of an appreciable portion of the available volume of the combustion chamber to thus limit the combustion volume downstream of the slide. This is especially noticeable as the size of the powerplant is decreased in view of the specific design practice restrictions such as O-ring groove dimensions, hole edge clearances, etc., which are independent of powerplant size so that the slide length may not decrease appreciably. Other problems are: the possibility of burning of the slide by injection of the propellants within it; the presentation of a location by the transition from slide diameter to combustion chamber diameter where very high heat transfer rates can be expected; the possibility of chemical reactivity of the propellants to cause slide erosion and/or corrosion leading to powerplant malfunction; and the requirement of seals between the propellant entry ports if the injector pressure drop is to be taken across orifices located within the slide.

Accordingly, the main object of the present invention is to provide an improved shear slide injector which obviates the above and other limitations imposed by cylindrical, axially moving, injector slides.

An important object of the present invention is to provide a rotatable shear slide injector which occupies but a small volume at the head of the combustion chamber and which will not be subject to burning or erosion.

Another important object of the present invention is to provide a rotatable shear slide injector which introduces no abnormally high heat transfer rates and does not require seals between the propellant entry ports.

A further important object of the present invention is to provide an improved shear slide injector which will afford economies in space requirements and improved performance of the powerplant and which will be economical of manufacture and more rugged and of longer life in use.

Other objects and advantages of the invention will become apparent during the course of the following description.

In the drawings I have shown one embodiment of the invention. In this showing:

Figures 1, 2:
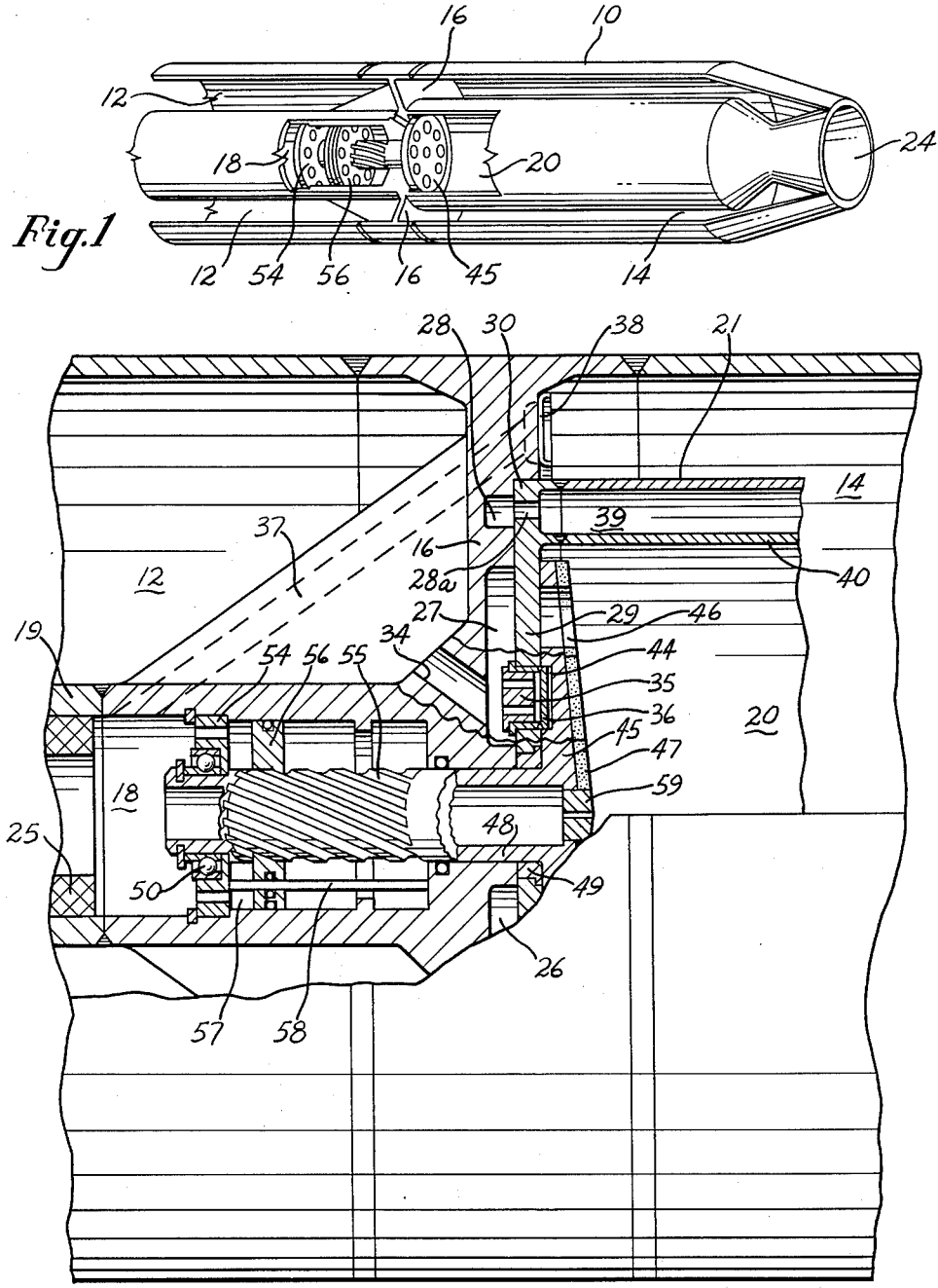
FIGURE 1 is a diagrammatic, cut-away longitudinal view of the invention in operative position in a rocket powerplant.
FIGURE 2 is a fragmentary, central, longitudinal sectional view thereof to an enlarged scale.

Referring to FIGURE 1 of the drawings, numeral 10 designates a rocket powerplant including annular propellant tanks 12 and 14 separated by a header 16, axially aligned gas generating and combustion chambers 18 and 20 respectively, defined by the inner walls 19 and 21 of the tanks, and an exhaust nozzle 24.

The gas generating chamber 18 contains a solid fuel 25 adapted to be ignited by conventional means (not shown) and extends aft to the header 16 which is provided on its aft or rear face with suitable bi-propellant manifolding recesses 26, 27, 28, which are closed by an injector plate 29 mounted in a recess 30 of the face.

Propellant A in the tank 12 is admitted to the manifold recess 27 by a passage 34 and is hermetically sealed and thus prevented from passing into the combustion chamber 20 by way of one of the plurality of angularly spaced injection nozzles 35, mounted in apertures in the injector plate 29 by shear cups 36 in which the nozzles are mounted. Propellant B in the tank 14 is subject to generated gas pressure from the chamber 18 by a passage 37 sealed off by a burst disc 38 and when pressurized, passes from the aft end of the powerplant to the manifold recess 28 by way of the coolant jacket 39 defined by the inner wall 21 of the propellant tank 14 and the wall 40 of the combustion chamber 20 and through an aperture 28a in the injector plate 29.

Figure 3:
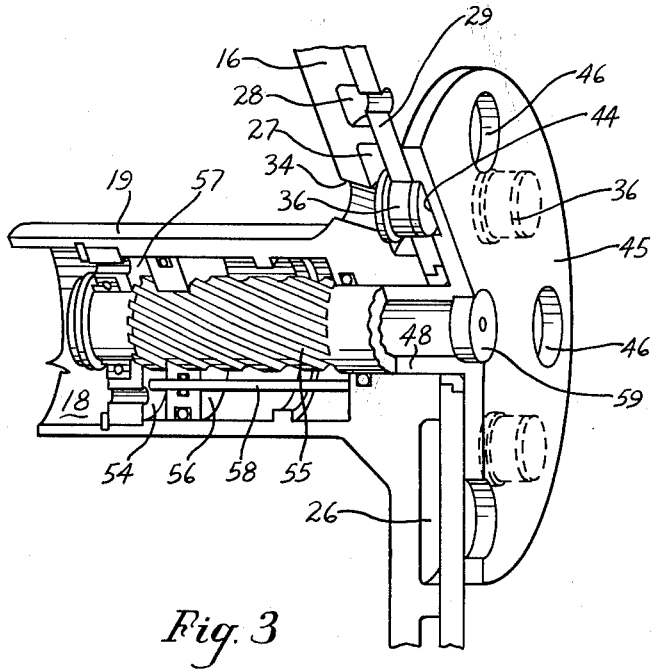
FIGURE 3 is a perspective view of the shear slide injector in storage position before rotation.
Figure 4:
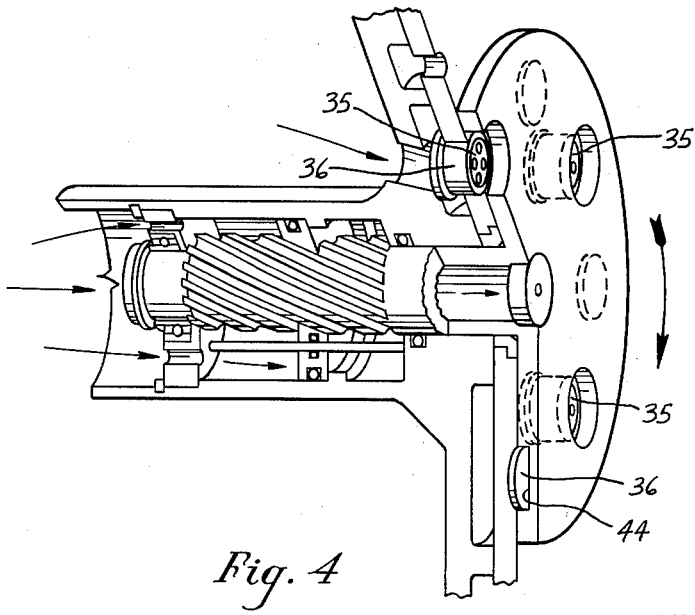
FIGURE 4 is a similar view after the shear slide has been rotated for controlled injection of the propellants into the combustion chamber.

The shear cups 36 are restrained by and seated in angularly spaced circular recesses 44 formed in the forward side of a rotatable shear plate 45 which includes injection orifices 46 formed therein intermediate the recesses 44 (FIGURES 3 and 4). The rear face of the rotatable shear plate 45 is provided with a ceramic layer 47 to prevent burning.

The shear plate 45 is fixed to or integral with a hollow shaft 48 which is rotatably mounted in the gas generating chamber 18 by a plain bearing 49 and by a ball-bearing assembly 50 arranged in an apertured plate 54 seated against a shoulder of the chamber wall, the shaft and plate being suitably retained in position by split rings. An intermediate portion 55 of the shaft 48 is helically splined and mounted thereon is a circular piston 56 which has a helically splined bore and defines a pressure chamber 57 with the apertured plate 54.

It will be readily apparent that pressure gases from the generating chamber 18 will pass through the apertured plate 54 and act against the piston 56 to move it axially in an aft direction. Inasmuch as the piston 56 is constrained against rotation by a rod 58 passing therethrough and fixed in the plate 54 and the header 16, axial movement of the piston 56 forces the shaft 48 to rotate due to the helical splines and thus rotate the shear plate 45. The piston 56, the rod 58, and the shaft 48 are sealed against leakage by O-rings. The aft end of the shaft 48 is closed by an orificed injector plug 59 by which generated gases may pass directly to the combustion chamber 20.

The operation of the rotatable shear slide injector is believed to be apparent. As seen in FIGURES 2 and 3, the shear cups 36 prevent flow of propellant through the injector nozzles 35 and are seated in the recesses 44 of the rotatable shear plate 45. The injection orifices 46 positioned intermediate the recesses 44 are alignable with the injection nozzles 35 by rotating the shear plate 45 through an angle of 45 degrees.

When it is desired to operate the packaged powerplant 10, the solid fuel 25 is ignited to produce high pressure gases in the generating chamber 18. The propellants A and B being pressurized are ready for injection through the injector nozzles 35 and injection orifices 46 into the combustion chamber 20 upon shearing of the cups 36 and alignment of the orifices with the nozzles.

The generated high pressure gases in the chamber 18 will pass through the apertured plate 54 into the pressure chamber 57 and act against the forward side of the piston to move it axially and non-rotatably in the aft direction. The movement of the piston forces rotation of the shaft 48 and hence of the shear plate 45 to shear off the bottom of the shear cups (which are retained in the recesses 44, FIGURE 4) and align the injection orifices 46 with the injector nozzles 35. The axial travel of the piston 56 and the helix angle are correlated to insure the proper alignment of the nozzles and orifices upon rotation of the shear plate 45.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. The combination with a liquid propellant powerplant having a propellant tank, a combustion chamber communicating therewith and terminating in an exhaust nozzle, a propellant injector plate including an injection nozzle for permitting flow of propellant from the tank to the combustion chamber, and a shear cup projecting from the plate and sealing off flow through the injection nozzle; of rotatable means mounted adjacent the injector plate and operative upon rotation to rupture the shear cup and admit propellant to the combustion chamber.

2. The combination with a liquid propellant powerplant having a propellant tank, a combustion chamber communicating therewith and terminating in an exhaust nozzle, a propellant injector plate including an injection nozzle for permitting flow of propellant from the tank to the combustion chamber, and a shear cup projecting from the plate and sealing off flow through the injection nozzle; of rotatable means mounted adjacent the injector plate and operative upon rotation to rupture the shear cup and admit propellant to the combustion chamber, means mounted in the powerplant for generating pressure gases, and means connected to said rotatable means and responsive to generated gas pressure to effect rotation of said rotatable means.

3. The combination with a liquid propellant powerplant having a propellant tank, a combustion chamber communicating therewith and terminating in an exhaust nozzle, a propellant injector plate including an injection nozzle for permitting flow of propellant from the tank to the combustion chamber, and a shear cup projecting from the plate and sealing off flow through the injection nozzle; of a rotatable shear plate operative upon rotation to rupture the shear cup and admit propellant to the combustion chamber.

4. The combination with a liquid propellant powerplant having a propellant tank, a combustion chamber communicating therewith and terminating in an exhaust nozzle, a propellant injector plate including an injection nozzle for permitting flow of propellant from the tank to the combustion chamber, and a shear cup projecting from the plate and sealing off flow through the injection nozzle; of a rotatable shear plate operative upon rotation to rupture the shear cup and admit propellant to the combustion chamber, means mounted in the powerplant for generating pressure gases, and means connected to said rotatable shear plate and responsive to generated gas pressure to effect rotation of said shear plate.

5. The combination with a liquid propellant powerplant having a propellant tank, a combustion chamber communicating therewith and terminating in an exhaust nozzle, a propellant injector plate including an injection nozzle for permitting flow of propellant from the tank to the combustion chamber, and a shear cup projecting from the plate and sealing off flow through the injection nozzle; of a rotatable shear plate including an injection orifice and operative upon rotation to rupture the shear cup and align the injection orifice with the injection nozzle to admit propellant to the combustion chamber.

6. A propellant injector for liquid propellant rocket powerplants including a propellant tank and a combustion chamber communicating therewith comprising a propellant injector plate including an injection nozzle for permitting flow of propellant to the combustion chamber, a shear cup projecting from the plate and sealing off flow through the nozzle, and rotatable means mounted adjacent the injector plate and operative upon rotation to shear off the cup and admit propellant to the combustion chamber.

7. A propellant injector for liquid propellant rocket powerplants including a propellant tank and a combustion chamber communicating therewith comprising a propellant injector plate including an injection nozzle for permitting flow of propellant to the combustion chamber, a shear cup projecting from the plate and sealing off flow through the nozzle, rotatable means mounted adjacent the injector plate and operative upon rotation to shear off the cup and admit propellant to the combustion chamber, means mounted in the powerplant for generating pressure gases, and additional means connected to said rotatable means and responsive to generated gas pressure to effect rotation of said rotatable means.

8. A shear slide injector for liquid propellant rocket powerplants including a propellant tank and a combustion chamber communicating therewith comprising an injection plate including angularly spaced injection nozzles separating the liquid propellant from the combustion chamber, shear cups supporting said nozzles in said plate and preventing propellant flow therethrough, a shear plate rotatably mounted against said injection plate, a plurality of shear cup engaging recesses and injection orifices alignable with said nozzles formed at alternate, angularly spaced points in said injection plate, and means connected to said shear plate for rotating it to shear off said cups and align said orifices with said nozzles to admit propellant to the combustion chamber.

9. A device as recited in claim 8 wherein said means comprises a helically splined shaft, a helically splined piston constrained against rotation mounted on said shaft, and pressure means operable against said piston to move it axially and effect rotation of said shaft and said shear plate.

10. A liquid propellant rocket powerplant comprsing axially aligned pressurizing gas generating and combustion chambers, a propellant injection plate including angularly spaced, propellant injection nozzles separating said gas generating and combustion chambers, propellant tanks surrounding said chambers and communicating with said nozzles, shear cups supporting said nozzles in said plate and preventing propellant flow therethrough, a shear plate rotatably mounted against said injection plate, a plurality of shear cup engaging recesses and injection orifices alignable with said nozzles formed in said injection plate, and means connected to said shear plate for rotating it to shear off said cups and align said orifices with said nozzles to admit propellant to said combustion chamber.

11. A device as recited in claim 10 wherein said means comprises a helically splined shaft, a helically splined piston constrained against rotation mounted on said shaft and responsive to pressure in said gas generating chamber to move axially and rotate said shaft and said shear plate.

References Cited in the file of this patent

UNITED STATES PATENTS 2,940,256     Conyers et al. _____ June 14, 1960
2,954,670     Helus et al. _____ Oct. 4, 1960